United States Patent
Yamazaki et al.

(10) Patent No.: US 12,157,921 B2
(45) Date of Patent: Dec. 3, 2024

(54) COATING LIQUID FOR FORMING INSULATION COATING FOR GRAIN-ORIENTED ELECTRICAL STEEL SHEET, METHOD OF MANUFACTURING GRAIN-ORIENTED ELECTRICAL STEEL SHEET, AND GRAIN-ORIENTED ELECTRICAL STEEL SHEET

(71) Applicant: NIPPON STEEL CORPORATION, Tokyo (JP)

(72) Inventors: Shuichi Yamazaki, Tokyo (JP); Kazutoshi Takeda, Tokyo (JP); Hiroyasu Fujii, Tokyo (JP); Toru Nagai, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 964 days.

(21) Appl. No.: 16/975,668

(22) PCT Filed: Mar. 19, 2019

(86) PCT No.: PCT/JP2019/011441
§ 371 (c)(1),
(2) Date: Aug. 25, 2020

(87) PCT Pub. No.: WO2019/188585
PCT Pub. Date: Oct. 3, 2019

(65) Prior Publication Data
US 2021/0002738 A1    Jan. 7, 2021

(30) Foreign Application Priority Data
Mar. 28, 2018   (JP) ................................ 2018-061745

(51) Int. Cl.
*C21D 8/12*   (2006.01)
*C09D 1/00*   (2006.01)
(Continued)

(52) U.S. Cl.
CPC ............. *C21D 8/1283* (2013.01); *C09D 1/00* (2013.01); *C09D 7/61* (2018.01); *C09D 7/69* (2018.01);
(Continued)

(58) Field of Classification Search
CPC ................ C21D 8/1283; C21D 8/1244; C21D 2201/05; C21D 9/46; C09D 1/00;
(Continued)

(56) References Cited

U.S. PATENT DOCUMENTS 3,856,568 A   12/1974   Tanaka et al.
5,411,808 A   5/1995   Kanai et al.
(Continued)

FOREIGN PATENT DOCUMENTS

JP   48-39338 A   6/1973
JP   54-143737 A   11/1979
(Continued)

OTHER PUBLICATIONS

"Determination of the specific surface area of powders (solids) by gas adsorption—BET method", JIS Z 8830, (2013), total of 26 pages.
"Methods of salt spray testing", JIS Z 2371, (2000), total of 7 pages.
"Test methods for electrical steel strip and sheet", JIS C 2550-1, (2011), total of 8 pages.

*Primary Examiner* — Anthony M Liang
*Assistant Examiner* — Danny N Kang
(74) *Attorney, Agent, or Firm* — Birch, Stewart, Kolasch & Birch, LLP

(57) ABSTRACT

In the present invention, there is provided a coating liquid for forming an insulation coating for a grain-oriented electrical steel sheet, including: a solvent; and one or two more layered clay mineral powders having a specific surface area of 20 m²/g or more. In addition, in the present invention, there is provided a grain-oriented electrical steel sheet including: a base metal; and an insulation coating provided (Continued)

on a surface of the base metal, in which the insulation coating contains $SiO_2$, and one or two of $Al_2O_3$ and MgO, and has a porosity of 10% or less.

4 Claims, 2 Drawing Sheets

(51) Int. Cl.
    *C09D 7/40*     (2018.01)
    *C09D 7/61*     (2018.01)
    *C23C 30/00*     (2006.01)

(52) U.S. Cl.
    CPC ............ *C21D 8/1244* (2013.01); *C23C 30/00* (2013.01); *C21D 2201/05* (2013.01); *C23C 2222/00* (2013.01)

(58) Field of Classification Search
    CPC .............. C09D 7/61; C09D 7/69; C09D 5/08; C09D 7/45; C09D 7/70; C23C 30/00; C23C 2222/00; C23C 22/33; C23C 22/68; C23C 22/74; C23C 24/08; C23C 22/24; C23C 22/00; C08K 3/34; C08K 2003/321; C08K 2201/006
See application file for complete search history.

(56) References Cited

U.S. PATENT DOCUMENTS

| | | | |
|---|---|---|---|
| 2012/0088096 A1* | 4/2012 | Takeda | .................. C04B 28/344 |
| | | | 428/327 |
| 2016/0281186 A1* | 9/2016 | Belgrand | .................. H01F 1/18 |
| 2016/0305026 A1 | 10/2016 | Terashima et al. | |
| 2017/0298229 A1 | 10/2017 | Yildirim et al. | |

FOREIGN PATENT DOCUMENTS

| | | |
|---|---|---|
| JP | 6-65754 A | 3/1994 |
| JP | 6-65755 A | 3/1994 |
| JP | 2000-169972 A | 6/2000 |
| JP | 2000-178760 A | 6/2000 |
| JP | 2010-37602 A | 2/2010 |
| JP | 2010-43293 A | 2/2010 |
| JP | 2016-507006 A | 3/2016 |
| JP | 2017-75358 A | 4/2017 |
| JP | 2017-511840 A | 4/2017 |
| WO | WO 2010/146821 A1 | 12/2010 |
| WO | WO 2014/121853 A1 | 8/2014 |
| WO | WO 2015/114068 A1 | 8/2015 |
| WO | WO 2015/115036 A1 | 8/2015 |

* cited by examiner

COATING LIQUID FOR FORMING INSULATION COATING FOR GRAIN-ORIENTED ELECTRICAL STEEL SHEET, METHOD OF MANUFACTURING GRAIN-ORIENTED ELECTRICAL STEEL SHEET, AND GRAIN-ORIENTED ELECTRICAL STEEL SHEET

TECHNICAL FIELD OF THE INVENTION

The present invention relates to a coating liquid for forming an insulation coating for a grain-oriented electrical steel sheet, a method of manufacturing a grain-oriented electrical steel sheet, and a grain-oriented electrical steel sheet.

Priority is claimed on Japanese Patent Application No. 2018-061745, filed on Mar. 28, 2018, the content of which is incorporated herein by reference.

RELATED ART

A grain-oriented electrical steel sheet is a steel sheet having a crystal structure with a (110) [001] orientation as a main orientation and usually containing 2 mass % or more of Si. The main application thereof is a material of a transformer core or the like, and particularly, there is a demand for a material having a small energy loss at the time of voltage conversion, that is, a material having a low iron loss.

A typical manufacturing process of a grain-oriented electrical steel sheet is as follows. First, a slab containing 2 mass % to 4 mass % of Si is hot-rolled and the hot-rolled sheet is annealed. Next, cold rolling is performed once or twice or more times with intermediate annealing between the cold rolling to obtain a final sheet thickness, and decarburization annealing is performed. Thereafter, an annealing separating agent primarily containing MgO is applied and final annealing is performed. Accordingly, a crystal structure having a (110) [001] orientation as a main orientation is developed, and a final-annealed film primarily containing $Mg_2SiO_4$ is formed on the surface of the steel sheet. Last, a coating liquid for forming an insulation coating is applied and baked, and the resultant is shipped.

In the related art, various coating liquids for forming an insulation coating on a grain-oriented electrical steel sheet have been known (for example, refer to Patent Documents 1 to 10).

PRIOR ART DOCUMENT

Patent Document

[Patent Document 1] Japanese Unexamined Patent Application, First Publication No. S48-039338
[Patent Document 2] Japanese Examined Patent Application, Second Publication No. S54-143737
[Patent Document 3] Japanese Unexamined Patent Application, First Publication No. 2000-169972
[Patent Document 4] Japanese Unexamined Patent Application, First Publication No. 2000-178760
[Patent Document 5] PCT International Publication No. WO2015/115036
[Patent Document 6] Japanese Unexamined Patent Application, First Publication No. H06-065754
[Patent Document 7] Japanese Unexamined Patent Application, First Publication No. H06-065755
[Patent Document 8] Japanese Unexamined Patent Application, First Publication No. 2010-043293
[Patent Document 9] Japanese Unexamined Patent Application, First Publication No. 2010-037602
[Patent Document 10] Japanese Unexamined Patent Application, First Publication No. 2017-075358

DISCLOSURE OF THE INVENTION

Problems to be Solved by the Invention

It has been found that the grain-oriented electrical steel sheet has a property that iron loss is improved by applying tension to the steel sheet. Therefore, by forming an insulation coating of a material having a smaller thermal expansion coefficient than a steel sheet at a high temperature, tension is applied to the steel plate, and the iron loss can be improved.

An insulation coating disclosed in Patent Document 1, which is obtained by baking a coating liquid containing colloidal silica, monophosphate, and chromic acid is excellent in various film characteristics such as tension.

However, the coating liquid for forming the above-mentioned insulation coating contains hexavalent chromium, and it is desired to develop a coating liquid for forming an insulation coating of a grain-oriented electrical steel sheet, which does not contain such hexavalent chromium and can obtain an insulation coating excellent in various film characteristics such as tension.

For example, Patent Documents 2 to 5 describe coating liquids for forming an insulation coating of a grain-oriented electrical steel sheet, which primarily contain colloidal silica and monophosphate and use other additives instead of chromic acid.

However, further improvement is desired from the viewpoint of coating tension in an insulation coating obtained by an insulation coating liquid, which does not contain chromic acid and uses additives other than chromic acid. In addition, many additives used in these techniques are more expensive than chromic acid.

On the other hand, insulation coating liquids described in Patent Documents 6 and 7 are formed of a mixture of alumina sol and boric acid. The coating tension of an insulation coating formed by baking this coating liquid is larger than that of the insulation coating obtained by baking the above-mentioned coating liquid containing colloidal silica, monophosphate, and chromic acid.

However, this insulation coating has room for further improvement from the viewpoint of corrosion resistance, and the alumina sol as a raw material is often expensive.

Therefore, the present inventors have paid attention to hydrated silicate (clay mineral) powder as a material whose raw materials are available at relatively low cost and with which a large coating tension can be obtained after baking.

For example, Patent Document 8 discloses a coating liquid containing a hydrated silicate powder and monophosphate. In addition, Patent Document 9 discloses a coating liquid containing a hydrated silicate powder, monophosphate, and colloidal silica. Furthermore, Patent Document 10 discloses a coating liquid containing kaolin, which is a kind of hydrated silicate, and lithium silicate. Each of the insulation coatings obtained by baking the coating liquids described in these documents achieves a coating tension equal to or higher than that of the insulation coating obtained by baking the coating liquid containing colloidal silica, monophosphate, and chromic acid. In addition, the obtained grain-oriented electrical steel sheet has excellent iron loss.

However, there is room for further improvement in the insulation coating formed by these coating liquids from the viewpoint of the water resistance and corrosion resistance of the insulation coating.

Therefore, an object of the present invention is to provide a coating liquid for forming an insulation coating for a grain-oriented electrical steel sheet, which can form an insulation coating having excellent corrosion resistance while containing no or a reduced use amount of chromium compound, and can be used to manufacture a grain-oriented electrical steel sheet having superior iron loss, a method of manufacturing a grain-oriented electrical steel sheet capable of manufacturing a grain-oriented electrical steel sheet which is excellent in corrosion resistance while containing no or a reduced use amount of chromium compound and has superior iron loss, and a grain-oriented electrical steel sheet which is excellent in corrosion resistance while containing no or a reduced use amount of chromium compound and has superior iron loss.

Means for Solving the Problem

Means for solving the above problems include the following aspects.
(1) A coating liquid according to an aspect of the present invention is a coating liquid for forming an insulation coating for a grain-oriented electrical steel sheet, including:
a solvent; and
one or two or more layered clay mineral powders having a specific surface area of 20 $m^2/g$ or more.
(2) In the coating liquid according to (1),
the specific surface area of the layered clay mineral powder may be 150 $m^2/g$ or less.
(3) In the coating liquid according to (1) or (2),
the layered clay mineral powder may be one or two or more powders selected from the group consisting of kaolin, talc, and pyrophyllite.
(4) The coating liquid according to any one of (1) to (3) may further include:
an inorganic dispersant in an amount more than 0 mass % and equal to or less than 20 mass % with respect to the layered clay mineral powder.
(5) In the coating liquid according to (4),
the inorganic dispersant may be one or two or more selected from the group consisting of sodium diphosphate, sodium hexametaphosphate, sodium silicate, and potassium silicate.
(6) In the coating liquid according to any one of (1) to (5),
an amount of a chromium compound may be 4 mass % or less with respect to the layered clay mineral powder.
(7) A method of manufacturing a grain-oriented electrical steel sheet according to another aspect of the present invention includes:
a step of applying a coating liquid for forming the insulation coating for a grain-oriented electrical steel sheet according to any one of (1) to (6), to a base metal of the grain-oriented electrical steel sheet; and
a step of performing a baking treatment on the base metal after the application, at a temperature of 600° C. or higher and 1000° C. or lower to form an insulation coating.
(8) A grain-oriented electrical steel sheet according to another aspect of the present invention includes:
a base metal; and
an insulation coating provided on a surface of the base metal,
in which the insulation coating contains $SiO_2$, and one or two of $Al_2O_3$ and MgO, and
the insulation coating has a porosity of 10% or less.
Here, the base material is a grain-oriented electrical steel sheet immediately after the final annealing, and the base material may or may not have a final-annealed film.
(9) In the grain-oriented electrical steel sheet according to (8),
the insulation coating may further contain one or two or more selected from the group consisting of $Fe_2O_3$, $Na_2O$, $K_2O$, and $P_2O_5$.
(10) The grain-oriented electrical steel sheet according to (8) or (9),
an amount of a chromium compound of the insulation coating may be 4 mass % or less with respect to a dehydration product of a layered clay mineral.

Effects of the Invention

According to the present invention, there is provided a coating liquid for forming an insulation coating for a grain-oriented electrical steel sheet, which can form an insulation coating having excellent corrosion resistance while containing no or a reduced use amount of chromium compound, and can be used to manufacture a grain-oriented electrical steel sheet having superior iron loss. In addition, there is provided a method of manufacturing a grain-oriented electrical steel sheet capable of manufacturing a grain-oriented electrical steel sheet which is excellent in corrosion resistance while containing no or a reduced use amount of chromium compound and has superior iron loss. In addition, there is provided a grain-oriented electrical steel sheet which is excellent in corrosion resistance while containing no or a reduced use amount of chromium compound and has superior iron loss.

EMBODIMENTS OF THE INVENTION

Figure 1:
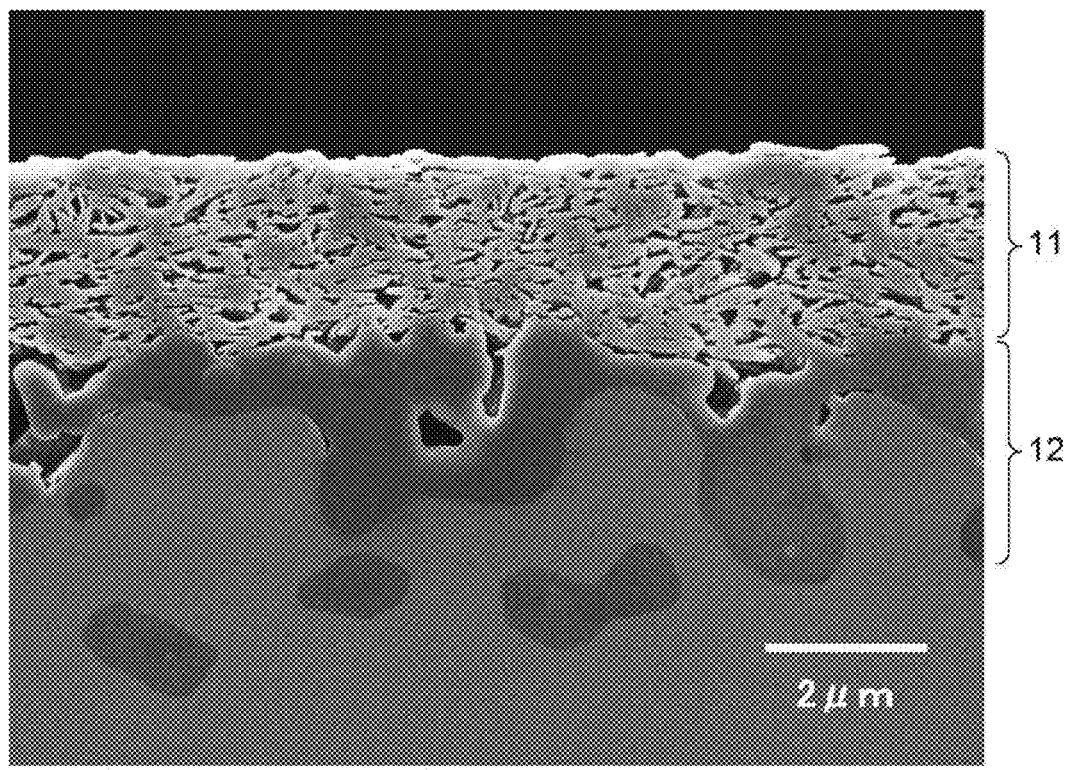
FIG. 1 is an image showing a cross-sectional structure of an insulation coating obtained by applying and baking a dispersion liquid containing a layered clay mineral powder of Comparative Example 2 (specific surface area 15 $m^2/g$).

Hereinafter, an example of embodiments of the present invention will be described.

In addition, in the present specification, a numerical value range represented by using "to" means a range including numerical values described before and after "to" as a lower limit and an upper limit.

In the present specification, the term "step" is used not only for an independent step but also for a case where the step cannot be distinguished from other steps as long as the intended purpose of the step is achieved.

In addition, it is obvious that elements of the following embodiments can be combined with each other.

<Coating Liquid for Forming Insulation Coating for Grain-Oriented Electrical Steel Sheet>

A coating liquid for forming an insulation coating for a grain-oriented electrical steel sheet according to the present embodiment (hereinafter, also simply referred to as "insulation coating liquid") contains a layered clay mineral powder having a specific surface area of 20 m$^2$/g or more, and a solvent such as water.

In the related art, in a case where an insulation coating of a grain-oriented electrical steel sheet is to be formed by applying and baking a coating liquid containing a layered clay mineral powder in a solvent, it is difficult to form a dense film with a coating liquid containing only a single layered clay mineral powder as a solid component. Therefore, a coating liquid containing a binder such as monophosphate or lithium silicate is applied to the surface of the base metal of the grain-oriented electrical steel sheet, and baked at a predetermined temperature to obtain an insulation coating. Such an insulation coating can obtain a coating tension equal to or higher than that of an insulation coating obtained by baking a coating liquid containing colloidal silica, monophosphate, and chromic acid.

However, according to the examination of the present inventors, it has been found that the grain-oriented electrical steel sheet having the insulation coating thus manufactured has room for further improvement from the viewpoint of corrosion resistance. In addition, it has been also found that the coating liquid containing the layered clay mineral powder and the binder increases in viscosity with time even at room temperature, and sometimes gelates.

The present inventors have found that a coating liquid obtained by dispersing a layered clay mineral powder having a specific surface area of 20 m$^2$/g or more in a solvent easily forms an insulation coating while containing no or a reduced use amount of the binder added as described above, and can obtain a coating tension equal to or higher than that of an insulation coating obtained by baking a coating liquid containing colloidal silica, monophosphate, and chromic acid.

Furthermore, the present inventors have found that it is possible to manufacture a grain-oriented electrical steel sheet which can form an insulation coating having excellent corrosion resistance while containing no or a reduced use amount of chromium compound, and has superior iron loss.

The coating liquid according to the present embodiment may not substantially contain a binder (for example, monophosphate, lithium silicate, a water-soluble lithium salt, or the like), and can easily form an insulation coating while containing no or a reduced use amount of binder added.

The coating liquid according to the present embodiment does not contain a binder and may contain a layered clay mineral powder and a solvent. Accordingly, an effect of improving the water resistance of the film after baking is obtained. In a case where phosphoric acid or phosphate is used as the binder, the coating liquid tends to gelate. However, in a case where no binder is contained, the gelation can be suppressed.

In addition, it is preferable that the coating liquid according to the present embodiment does not substantially contain a chromium compound (chromic acid, hexavalent chromium, or the like). Specifically, the amount of a chromium compound is preferably 4 parts by mass or less with respect to 100 parts by mass of the layered clay mineral powder. The amount of the chromium compound is more preferably 2 parts by mass or less, even more preferably 1 part by mass or less, and particularly preferably 0 parts by mass with respect to 100 parts by mass of the layered clay mineral powder.

Also in a grain-oriented electrical steel sheet according to the present embodiment, it is preferable that the insulation coating does not substantially contain a chromium compound. Specifically, the amount of the chromium compound is preferably 4 parts by mass or less with respect to 100 parts by mass of a dehydration product of the layered clay mineral. The amount of the chromium compound is more preferably 2 parts by mass or less, even more preferably 1 part by mass or less, and particularly preferably 0 parts by mass with respect to 100 parts by mass of the dehydration product of the layered clay mineral.

Hereinafter, each material included in the coating liquid according to the present embodiment will be described.

(Layered Clay Mineral Powder)

The layered clay mineral powder has a laminated structure of a 1:1 silicate layer represented by a composition formula $X_{2-3}Si_2O_5(OH)_4$ and a 2:1 silicate layer represented by a composition formula $X_{2-3}(Si,Al)_4O_{10}(OH)_2$ (X is Al, Mg, Fe, or the like) singly or as a mixture. There are cases where at least one of water molecules and ions are included between the layers of the layered structure.

Representative examples of the layered clay mineral include kaolin (or kaolinite) $(Al_2Si_2O_5(OH)_4)$, talc $(Mg_3Si_4O_{10}(OH)_2)$, and pyrophyllite $(Al_2Si_4O_{10}(OH)_2)$. Many layered clay mineral powders are obtained by refining and pulverizing naturally occurring layered clay minerals. As the layered clay mineral powder, one or two or more of kaolin powder, talc powder, and pyrophyllite powder may be used in view of industrial availability. The layered clay mineral powders may be used in combination.

The layered clay mineral powder used in the present embodiment has a specific surface area of 20 m$^2$/g or more, and preferably 40 m$^2$/g or more.

Although not particularly limited, the specific surface area of the layered clay mineral powder is preferably 150 m$^2$/g or less. When the specific surface area of the layered clay mineral powder falls within this range, the stability (viscosity stability) of a dispersion liquid is easily maintained by the addition of a dispersant.

The specific surface area of the layered clay mineral powder is measured by the method of JIS Z 8830:2013.

(Manufacturing of Layered Clay Mineral Powder Having Specific Surface Area of 20 m$^2$/g or More)

It is difficult to obtain a layered clay mineral powder having a specific surface area of 20 m$^2$/g or more among commercially available layered clay mineral powders for industrial use. Therefore, for example, a layered clay mineral powder having a specific surface area of 20 m$^2$/g or more can be obtained by subjecting a commercially available product to a pulverizing treatment.

As pulverizing means, a ball mill, a vibratory mill, a bead mill, a jet mill, and the like are effective. In these pulverization treatments, any of dry pulverization in which powder is pulverized as it is and a wet treatment performed while a layered clay mineral powder is dispersed in water or alcohol in a slurry state is effective.

Since the specific surface area increases with the pulverization time together with various pulverizing means, a clay mineral powder having a required specific surface area and a dispersion liquid thereof can be obtained by controlling the pulverization time.

In the case of the wet pulverization treatment, when the specific surface area of the layered clay mineral powder is increased to a specific surface area of 20 m$^2$/g or more by pulverization, the viscosity of the dispersion liquid is increased and gelation may occur, which may cause a problem in the pulverization treatment. The increase in viscosity during the pulverization treatment can be suppressed by adding a dispersant.

However, when an organic dispersant is added, there are cases where the dispersant is decomposed and carbonized at the time of baking the insulation coating and may be carburized in the grain-oriented electrical steel sheet. Therefore, an inorganic dispersant is preferable. Examples of the inorganic dispersant include polyphosphate and water glass. Specific examples of the former include sodium diphosphate and sodium hexametaphosphate. Specific examples of the latter include sodium silicate and potassium silicate.

The addition amount of these inorganic dispersants is preferably suppressed to 20 mass % or less with respect to the layered clay mineral powder. By causing the addition amount of the inorganic dispersant to be 20 mass % or less, a change in the film composition after baking is suppressed, and a higher coating tension can be easily obtained.

The addition amount of the inorganic dispersant is more preferably 1 mass % or more.

In the case of the dry pulverization treatment, no dispersant may be added at the time of pulverization.

(Method of Preparing Coating Liquid)

In the preparation of the insulation coating liquid according to the present embodiment, the insulation coating liquid is obtained by adding a layered clay mineral powder having a specific surface area of 20 $m^2/g$ or more to a solvent such as water, adding other additives as necessary, and mixing and stirring the resultant. As the layered clay mineral powder, a single or a plurality of layered clay mineral powders mixed may be used. In a case where a layered clay mineral powder having a specific surface area of 20 $m^2/g$ or more is prepared by the dry pulverization treatment, there are cases where thickening and gelation occur after the mixing with the solvent such as water. In order to suppress this, it is effective to add the above-mentioned inorganic dispersant in a range of 20 mass % or less with respect to the layered clay mineral powder during the preparation of the coating liquid.

As the solvent used for the coating liquid, in addition to water, for example, alcohols such as ethyl alcohol, methyl alcohol, and propyl alcohol can be used as subsidiarily. As the solvent used for the coating liquid, it is desirable to use water having no flammability.

The concentration of the layered clay mineral powder of the insulation coating liquid is not particularly limited as long as the insulation coating liquid can be applied to a grain-oriented electrical steel sheet. The concentration (solid content concentration) of the layered clay mineral powder of the insulation coating liquid is, for example, preferably 5.0 mass % to 50.0 mass %, and more preferably 10.0 mass % to 30.0 mass %.

In a case where a small amount of other additives is contained, for example, the amount of the other additives may be 3 mass % or less, and may be 1 mass % or less with respect to the total solid content of the insulation coating liquid according to the present embodiment. In addition, examples of the other additives include, for example, a surfactant that prevents repelling of a coating liquid on a steel sheet.

<Method of Manufacturing Grain-Oriented Electrical Steel Sheet>

Next, a method of manufacturing a grain-oriented electrical steel sheet according to the present embodiment will be described.

The method of manufacturing a grain-oriented electrical steel sheet according to the present embodiment includes: a step of applying a coating liquid for forming an insulation coating for a grain-oriented electrical steel sheet, to a base metal of a grain-oriented electrical steel sheet, that is, a grain-oriented electrical steel sheet that has been completed up to a final annealing step; and a step of performing a baking treatment on the base metal after the application. The coating liquid is a coating liquid containing a layered clay mineral powder having a specific surface area of 20 $m^2/g$ or more. An inorganic dispersant is added to the coating liquid as necessary.

Base Metal of Grain-Oriented Electrical Steel Sheet (Grain-Oriented Electrical Steel Sheet after Final Annealing)

The grain-oriented electrical steel sheet after the final annealing is a grain-oriented electrical steel sheet serving as a base metal before the coating liquid (that is, the insulation coating liquid according to the present embodiment) is applied. The grain-oriented electrical steel sheet after the final annealing is not particularly limited.

For the grain-oriented electrical steel sheet serving as the base metal, specifically, for example, a steel ingot containing 2 mass % to 4 mass % of Si is subjected to hot rolling, hot-band annealing, and cold rolling, and thereafter subjected to decarburization annealing. Thereafter, an annealing separating agent such as a MgO-content of 50 mass % or more is applied and final annealing is performed, whereby the grain-oriented electrical steel sheet is obtained. When MgO is used as the annealing separating agent, the final-annealed film is formed on the steel sheet surface in many cases. However, when other annealing separating agents are used, the final-annealed film is not necessarily formed. The grain-oriented electrical steel sheet after the final annealing, that is the base metal, may not have a final-annealed film.

(Application and Baking Treatment of Insulation Coating Liquid)

After applying the insulation coating liquid according to the present embodiment to the grain-oriented electrical steel sheet (base metal) after the final annealing, a baking treatment is performed thereon.

The application amount of the coating liquid is not particularly limited, but in terms of film strength, space factor, excellent corrosion resistance and water resistance, and furthermore, obtaining an iron loss reducing effect, the coating liquid is suitably applied so that the amount of the film after the formation of the insulation coating is in a range of 1 $g/m^2$ to 10 $g/m^2$. More preferably, the application amount of the coating liquid is 2 $g/m^2$ to 8 $g/m^2$ as the amount of the film after the formation of the insulation coating. The application amount after the baking treatment can be obtained from the difference in mass before and after the insulation coating is removed off.

A method of applying the insulation coating liquid to the grain-oriented electrical steel sheet after the final annealing is not particularly limited. For example, an application method using an application type such as a roll type, a spray type, or a dip type may be used.

After applying the insulation coating liquid, baking is performed. Many layered clay mineral powders release water of constitution at near a heating temperature of 550° C. to form a film. Therefore, a baking temperature may be set to 600° C. or higher. On the other hand, in a case where a baking temperature of higher than 1000° C. is adopted, the grain-oriented electrical steel sheet is softened and easily strained. Therefore, the baking temperature may be set to 1000° C. or lower.

In a case where the baking temperature is low, it is preferable to increase a baking time. A preferable lower limit of the baking temperature is 700° C. or higher. A preferable upper limit of the baking temperature is 950° C. or lower. The baking time is preferably 5 seconds to 300 seconds, and more preferably 10 seconds to 120 seconds.

A heating method for performing the baking treatment is not particularly limited, and examples thereof include a radiant furnace, a air heating furnace, and induction heating.

The insulation coating after the baking treatment becomes a dense film. The thickness of the insulation coating is preferably 0.5 μm to 5 μm, and more preferably from 1 μm to 4 μm.

The thickness of the insulation coating after the baking treatment can be obtained by observing a cross section including the sheet thickness direction of the base metal of the grain-oriented electrical steel sheet with a scanning electron microscope (SEM).

Through the above steps, film characteristics such as a large coating tension and excellent corrosion resistance are obtained by the insulation coating liquid, and a grain-oriented electrical steel sheet having superior iron loss is obtained.

<Grain-Oriented Electrical Steel Sheet>

A grain-oriented electrical steel sheet according to the present embodiment includes: a base metal of a grain-oriented electrical steel sheet; and an insulation coating which is provided on the surface of the base metal, and contains $SiO_2$, and one or two selected from $Al_2O_3$ and MgO.

In addition, the insulation coating may further contain one or more selected from $Fe_2O_3$, $Na_2O$, $K_2O$, and $P_2O_5$.

The insulation coating is a dense film, and specifically has a porosity of 10% or less.

In the grain-oriented electrical steel sheet according to the present embodiment, since the insulation coating has the above-described configuration, a dense insulation coating can be achieved while containing no or a reduced use amount of the binder as described above, and a coating tension equal to or higher than that of an insulation coating obtained by baking a coating liquid containing colloidal silica, monophosphate, and chromic acid is obtained.

Further, even if no or a reduced use amount of chromium compound is used, an insulation coating having excellent corrosion resistance can be obtained, and a grain-oriented electrical steel sheet having superior iron loss is obtained.

In the grain-oriented electrical steel sheet according to the present embodiment, the porosity of the insulation coating is 10% or less. The porosity of the insulation coating is preferably 5% or less, and more preferably 1% or less.

Figure 3:
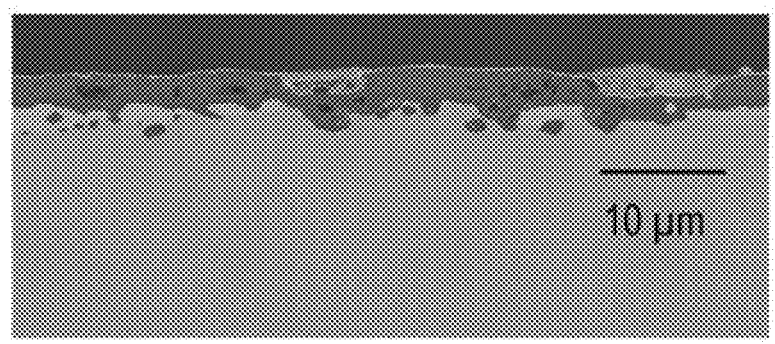
FIG. 3 is an explanatory view for describing a method of measuring a porosity.
Figure 3:
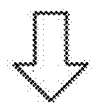
Figure 3:
Figure 3:
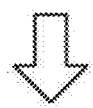
Figure 3:

The porosity (area fraction of pores contained in the insulation coating) in the insulation coating is measured by the following method. First, as shown in FIG. 3, a backscattered electron image of the cross section of the insulation coating is obtained by SEM. This image is subjected to binarization processing using image processing software such as Image-Pro, and the area $A_C$ of a cross section excluding the area of voids (pores) is obtained from the binary image (in the example of FIG. 3, $A_C$=197 μm$^2$).

In addition, the area A of a cross section including the area of voids (pores) is obtained from the image filled with the voids of the binarized image (A=260 μm$^2$ in the example of FIG. 3).

Then, the porosity F is calculated from $F=1-A_C/A$ (in the example of FIG. 3, F=1−197/260=24.1%).

The insulation coating of one grain-oriented electrical steel sheet is observed with SEM (at a magnification of 5000-fold) to obtain five images, and the porosity is calculated for each of the images by the above-described method. The average value thereof is calculated, and defined as the porosity of the insulation coating.

The insulation coating of the grain-oriented electrical steel sheet according to the present embodiment contains $SiO_2$, and one or two selected from $Al_2O_3$ and MgO, and may further contain one or two or more selected from $Fe_2O_3$, $Na_2O$, $K_2O$, and $P_2O_5$.

An insulation coating having a porosity of 10% or less can be formed by applying the coating liquid for forming the insulation coating for a grain-oriented electrical steel sheet according to the above-described embodiment and performing a baking treatment at a temperature of 600° C. or higher and 1000° C. or lower.

Here, the constituent elements of $SiO_2$; one or two selected from $Al_2O_3$ and MgO; and one or two or more selected from $Fe_2O_3$, $Na_2O$, $K_2O$, and $P_2O_5$ contained in the insulation coating formed by the above method are dehydration products of the layered clay mineral and the inorganic dispersant.

It is preferable that the dehydration product of the layered clay mineral contained in the insulation coating is one or two or more dehydration products of the layered clay mineral selected from kaolin, talc, and pyrophyllite. The dehydration product of kaolin contains $Al_2O_3$ and $SiO_2$ in a molar ratio of approximately 1:2, the dehydration product of talc contains MgO and $SiO_2$ in a molar ratio of approximately 3:4, and the dehydration product of pyrophyllite contains $Al_2O_3$ and $SiO_2$ in a molar ratio of approximately 1:4. However, since the layered clay mineral is produced naturally, the above molar ratio fluctuates by about 10% and may contain $Fe_2O_3$ as an impurity.

In the present embodiment, there are cases where an inorganic dispersant is added to the coating liquid for forming the insulation coating for a grain-oriented electrical steel sheet. However, these are also dehydrated after baking to become anhydrides, and often react with the dehydration products of the layered clay mineral. The insulation coating may contain a dehydration product derived from an inorganic dispersant or a reaction product thereof with the dehydration product of the layered clay mineral in an amount more than 0 mass % and equal to or less than 20 mass % with respect to the dehydration product of the layered clay mineral.

As the inorganic dispersant, those described above in the section of the coating liquid are similarly suitable. For example, sodium diphosphate or sodium hexametaphosphate, which is a kind of inorganic dispersant, contains $Na_2O$ and $P_2O_5$ after baking. In the case of sodium silicate, the inorganic dispersant contains $Na_2O$ and $SiO_2$. In the case of potassium silicate, the inorganic dispersant contains $K_2O$ and $SiO_2$.

While the exemplary embodiments of the present invention have been described, the present invention is not limited thereto. The above description is an example, and any element having substantially the same configuration as that of the technical idea described in the claims of the present invention and having the same action and effect belongs to the technical scope of the present invention.

EXAMPLES

Hereinafter, the present invention will be described specifically with reference to examples, but the present invention is not limited thereto.

Example A

First, commercially available fine powders of kaolinite, talc, and pyrophyllite (specific surface areas were all 10 m$^2$/g) were prepared and subjected to a pulverization treatment by various means shown in Table 1 below. In a case of adding a dispersant, the dispersant was added at the time of preparing a water slurry before the treatment in wet pulverization, and at the time of preparing a coating liquid after the pulverization treatment in dry pulverization. After the pulverization treatment, the specific surface area of a layered clay mineral powder was measured by the method of JIS Z 8830:2013.

A coating liquid having the composition shown in Table 1 was prepared using the layered clay mineral powder. In order to confirm the stability of the coating liquid, a portion of the prepared liquid was taken and left at room temperature for two days and nights to observe the state of the coating liquid (the presence or absence of gelation). The coating liquid shown in Example 13 is an example containing two kinds of layered clay mineral powder.

A grain-oriented electrical steel sheet (B8=1.93 T) having a final-annealed film that had been subjected to final annealing and having a sheet thickness of 0.23 mm was prepared, a coating liquid having the composition shown in Table 1 was applied using a roll coater so as to cause the amount of an insulation coating after a baking treatment to be 5 g/m², dried, and thereafter subjected to the baking treatment under the conditions of 850° C. and 30 seconds.

The composition of the coating liquid of a reference example in Table 1 is as follows.

Colloidal silica 20 mass % aqueous dispersion liquid: 100 parts by mass
Aluminum phosphate 50 mass % aqueous solution: 60 parts by mass
Chromic anhydride: 6 parts by mass The film characteristics, magnetic characteristics, water resistance, and corrosion resistance of the obtained grain-oriented electrical steel sheet provided with the insulation coating were evaluated. Furthermore, the porosity of the insulation coating was measured by the method described above.

Table 1 shows the results. The evaluation method of each evaluation shown in Table 1 is as follows.

(Coating Tension)

The coating tension is calculated from the curvature of the steel sheet generated when one side of the insulation coating is removed off. Specific conditions are as follows.

The insulation coating on only one side of the electrical steel sheet is removed with an alkaline aqueous solution. Thereafter, from the curvature of the electrical steel sheet, the coating tension is obtained by the following formula.

$$\sigma = Ed/\{3(1-\nu)R\} \quad \text{Formula}$$

Here, $\sigma$ is the film tension (MPa), E is Young's modulus of the steel sheet (MPa), d is a thickness of the steel sheet (mm), $\nu$ is Poisson's ratio of the steel sheet, and R is a radius of curvature of the steel sheet (mm)

(Iron Loss)

The iron loss is measured according to the method described in JIS C 2550-1 (2011). Specifically, the iron loss is measured as an iron loss ($W_{17/50}$) per unit mass under the conditions of an amplitude of 1.7 T of a measurement magnetic flux density and a frequency of 50 Hz.

(Water Resistance)

The water resistance was evaluated based on the amount of eluted film. A test piece was immersed in boiling water for one hour, a change in the weight of the test piece before and after the immersion was obtained, and this was defined as the amount of eluted film. Table 1 shows a film elution ratio (%), which is the ratio of the amount of the eluted film to the amount of the insulation coating formed. The smaller the film elution ratio (%), the better the water resistance.

(Corrosion Resistance)

The corrosion resistance was evaluated according to JIS Z 2371 (salt spray testing). The results are shown in Table 1 as a rust area ratio (%) after the test. The smaller the rust area ratio (%), the better the corrosion resistance.

TABLE 1

| | Layered clay mineral powder | Pulverizing method | Specific surface area of layered clay mineral powder (m²/g) | Concentration of layered clay mineral powder in coating liquid (mass %) | Dispersant | Concentration of dispersant with respect to layered clay mineral powder (mass %) |
|---|---|---|---|---|---|---|
| Comparative Example 1 | K | Absent | 10 | 25.0 | Not added | 0 |
| Comparative Example 2 | | BD | 15 | | Not added | 0 |
| Example 1 | | BD | 20 | | Not added | 0 |
| Example 2 | | BW | 50 | | SHMP | 5 |
| Example 3 | | BW | 150 | | SDP | 20 |
| Example 4 | | BW | 180 | | SIIMP | 20 |
| Comparative Example 3 | T | BW | 10 | | Not added | 0 |
| Comparative Example 4 | | BW | 15 | | Not added | 0 |
| Example 5 | | JM | 20 | | Not added | 0 |
| Example 6 | | BM | 80 | | SS | 5 |
| Example 7 | | BM | 150 | | PS | 20 |
| Example 8 | | BM | 180 | | SS | 20 |
| Example 9 | P | BW | 20 | | SDP | 0 |
| Example 10 | | BW | 80 | | SDP | 10 |
| Example 11 | | BW | 150 | | SDP | 20 |
| Example 12 | | BW | 180 | | SDP | 25 |
| Example 13 | K | BW | 100 | 12.5 | SDP | 10 |
| | T | BM | 60 | 12.5 | | |
| Comparative Example 5 | K | Absent | 10 | 20.0 | Sodium pyrophosphate | 8 |
| Comparative Example 6 | T | Absent | 10 | | Potassium tripolyphosphate | 1 |
| Comparative Example 7 | P | Absent | 10 | | Sodium disilicate | 5 |
| Reference | | | — | | | |

TABLE 1-continued

| Example | Stability of coating liquid | Porosity of coating (%) | Coating tension (MPa) | Iron loss (W/kg) | Film elution ratio (%) | Rust area ratio (%) | Note |
|---|---|---|---|---|---|---|---|
| Comparative Example 1 | Good | 30 | 3 | 1.00 | 0.0 | 20 | — |
| Comparative Example 2 | Good | 20 | 3 | 0.98 | 0.0 | 5 | — |
| Example 1 | Good | 10 | 10 | 0.81 | 0.0 | 0 | — |
| Example 2 | Good | 5 | 10 | 0.80 | 0.0 | 0 | — |
| Example 3 | Good | 2 | 10 | 0.80 | 0.0 | 0 | — |
| Example 4 | Gelated | 0 | 10 | 0.80 | 0.0 | 0 | — |
| Comparative Example 3 | Good | 30 | 3 | 0.99 | 0.0 | 20 | — |
| Comparative Example 4 | Good | 20 | 3 | 0.98 | 0.0 | 5 | — |
| Example 5 | Good | 10 | 10 | 0.81 | 0.0 | 0 | — |
| Example 6 | Good | 4 | 10 | 0.80 | 0.0 | 0 | — |
| Example 7 | Good | 2 | 10 | 0.80 | 0.0 | 0 | — |
| Example 8 | Gelated | 0 | 10 | 0.79 | 0.0 | 0 | — |
| Example 9 | Good | 10 | 10 | 0.80 | 0.0 | 0 | — |
| Example 10 | Good | 5 | 10 | 0.80 | 0.0 | 0 | — |
| Example 11 | Good | 2 | 10 | 0.80 | 0.0 | 0 | — |
| Example 12 | Good | 1 | 5 | 0.95 | 0.0 | 0 | — |
| Example 13 | Good | 4 | 10 | 0.80 | 0.0 | 0 | — |
| Comparative Example 5 | Good | 30 | 12 | 0.79 | 1.5 | 10 | Added 4 g of 50% aluminum phosphate to 100 g of clay mineral |
| Comparative Example 6 | Good | 20 | 11 | 0.80 | 10.0 | 5 | Added 30 g of 50% aluminum phosphate to 100 g of clay mineral |
| Comparative Example 7 | Good | 20 | 10 | 0.80 | 15.0 | 5 | Added 40 g of 50% aluminum phosphate to 100 g of clay mineral |
| Reference Example | Good | | 8 | 0.88 | 0.8 | 0 | — |

In Table 1, the abbreviations for the layered clay mineral powder, the abbreviations for the pulverization method, and the abbreviations for the dispersant names are as follows.
K: Kaolinite
T: Talc
P: Pyrophyllite
JM: Jet mill (dry type)
BD: Ball mill (dry type)
BW: Ball mill (wet type)
BM: Bead mill (wet type)
SDP: Sodium diphosphate
SHMP: Sodium hexametaphosphate
SS: Sodium silicate
PS: Potassium silicate As shown in Table 1, in a case where a coating liquid containing a layered clay mineral powder having a specific surface area of 20 m²/g or more by the pulverization treatment was applied and baked, the coating tension was large, the iron loss reduction effect was large, and the water resistance and corrosion resistance were very good. That is, it can be seen that performance equal to or higher than that of a film obtained by using the coating liquid containing a chromium compound shown in the reference example was obtained.

In addition, although a coating liquid having a large specific surface area is likely to gelate and the coating liquid workability tends to deteriorate, it can be seen from Examples 9 to 11 and Example 12 that the viscosity stability can be maintained by increasing the concentration of the dispersant in accordance with an increase in specific surface area.

However, when a dispersant for preventing gelation of the dispersion liquid is added in an amount more than 20 mass % as in Example 12, the film composition is affected, and the coating tension tends to deteriorate even when a layered clay mineral powder having a large specific surface area is used. Therefore, it can be seen that the upper limit of the dispersant added is preferably set to 20 mass %.

As shown in Examples 4 and 8, in a case where the specific surface area exceeds 150 m²/g, when the addition amount of the dispersant is suppressed to 20 mass % or less, the coating liquid easily gelates and cannot be easily applied with a simple application facility. However, this can be managed by using, for example, an application facility for a high-viscosity liquid such as a die coater.

Figure 2:
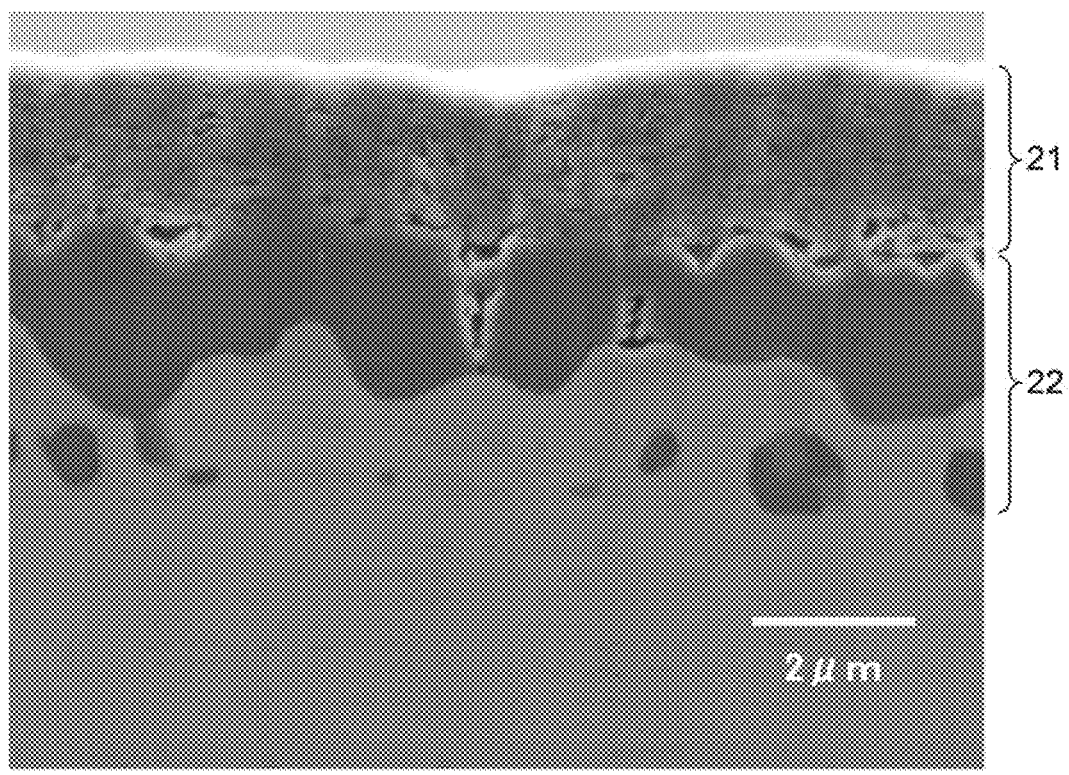
FIG. 2 is an image showing a cross-sectional structure of an insulation coating obtained by applying and baking a dispersion liquid containing a layered clay mineral powder of Example 2 (specific surface area 50 $m^2/g$).

Here, FIGS. 1 and 2 show the results of observing the cross section of the grain-oriented electrical steel sheet provided with the insulation coating of Comparative Example 2 and Example 2 by SEM (JSM 7000 manufactured by JEOL Ltd.). In FIGS. 1 and 2, reference numerals 11 and 21 denote insulation coatings, and reference numerals 12 and 22 denote final-annealed films (hereinafter, the reference numerals are omitted).

As shown in FIG. 2, it became clear that the insulation coating of Example 2 became a dense film with extremely few voids. As shown in FIG. 2, it is considered that since the insulation coating of Example 2 was dense, the coating tension was excellent and the iron loss was improved.

Example B

Next, the results of evaluating the film characteristics and the magnetic characteristics by changing the baking temperature are shown.

A coating liquid having the same composition as in Example 2 was applied by a roll coater and dried in the same procedure as in Example 2 so that the amount of the insulation coating after the baking treatment was 5 g/m². Then, the baking temperature was changed to the conditions shown in Table 2 and a baking treatment was performed. The baking time is the same as in Example A. Table 2 shows the results.

As shown in Table 2, it is considered that by setting the baking temperature to 600° C. or higher, the reaction between the hydrated silicate powder and the phosphate proceeds sufficiently and a high coating tension is obtained. It can be seen that each example in which the baking temperature is 600° C. or higher has excellent film characteristics and magnetic characteristics.

TABLE 2

|  | Baking temperature (° C.) | Coating tension (MPa) | Iron loss (W/kg) |
|---|---|---|---|
| Example B | 500 | 2 | 1.03 |
|  | 550 | 3 | 1.00 |
|  | 600 | 8 | 0.83 |
|  | 800 | 9 | 0.81 |
|  | 950 | 10 | 0.80 |

While the exemplary examples of the present invention have been described above, the present invention is not limited to these examples. It is obvious that those skilled in the art can arrive at various changes or modifications within the scope of the idea described in the claims, and it can be understood that these naturally belong to the technical scope of the present invention.

INDUSTRIAL APPLICABILITY

According to the present invention, there is provided a coating liquid for forming an insulation coating for a grain-oriented electrical steel sheet, which can form an insulation coating having excellent corrosion resistance while containing no or a reduced use amount of chromium compound, and can be used to manufacture a grain-oriented electrical steel sheet having superior iron loss. In addition, there is provided a method of manufacturing a grain-oriented electrical steel sheet capable of manufacturing a grain-oriented electrical steel sheet which is excellent in corrosion resistance while containing no or a reduced use amount of chromium compound and has superior iron loss. In addition, there is provided a grain-oriented electrical steel sheet which is excellent in corrosion resistance while containing no or a reduced use amount of chromium compound and has superior iron loss. Therefore, the present invention has high industrial utility value.

The invention claimed is:

1. A grain-oriented electrical steel sheet comprising:
a base metal; and
an insulation coating provided on a surface of the base metal,
wherein the insulation coating contains $SiO_2$, and one or both of $Al_2O_3$ and MgO,
wherein the insulation coating has a porosity of 10% or less,
wherein the composition of the insulation coating includes a dehydration product of a layered clay mineral having a specific surface area of 20 m²/g or more, and
wherein the amount of $P_2O_5$ in the insulation coating is 13 mass % or less.

2. The grain-oriented electrical steel sheet according to claim 1,
wherein the insulation coating further contains one or two or more selected from $Fe_2O_3$, $Na_2O$, $K_2O$, and $P_2O_5$.

3. The grain-oriented electrical steel sheet according to claim 1,
wherein an amount of a chromium compound of the insulation coating is 4 mass % or less with respect to a dehydration product of a layered clay mineral.

4. The grain-oriented electrical steel sheet according to claim 2,
wherein an amount of a chromium compound of the insulation coating is 4 mass % or less with respect to a dehydration product of a layered clay mineral.

* * * * *